(12) United States Patent
Yue

(10) Patent No.: US 7,530,725 B2
(45) Date of Patent: May 12, 2009

(54) LIGHT GUIDE PLATE WITH REFLECTIVE/REFRACTIVE DEPRESSIONS, AND BACKLIGHT MODULE USING THE SAME

(75) Inventor: Guo-Han Yue, ShenZhen (CN)

(73) Assignees: Hon Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 146 days.

(21) Appl. No.: 11/500,695

(22) Filed: Aug. 4, 2006

(65) Prior Publication Data

US 2007/0041216 A1 Feb. 22, 2007

(30) Foreign Application Priority Data

Aug. 19, 2005 (CN) .......................... 2005 1 0036762

(51) Int. Cl.
F21V 7/04 (2006.01)

(52) U.S. Cl. .......................... 362/620; 362/619; 362/26; 349/65

(58) Field of Classification Search ................. 362/620, 362/619, 26, 561; 349/65
See application file for complete search history.

(56) References Cited

U.S. PATENT DOCUMENTS

| | | | | |
|---|---|---|---|---|
| 3,043,947 A * | 7/1962 | Albinger, Jr. ................ | 362/634 |
| 4,811,507 A * | 3/1989 | Blanchet ..................... | 362/604 |
| 5,396,350 A * | 3/1995 | Beeson et al. ................ | 362/600 |
| 5,467,417 A * | 11/1995 | Nakamura et al. ........... | 362/620 |
| 5,719,649 A * | 2/1998 | Shono et al. ................. | 362/617 |
| 5,890,791 A * | 4/1999 | Saito ........................... | 362/620 |
| 6,011,602 A * | 1/2000 | Miyashita et al. ............ | 362/620 |
| 6,402,334 B1 * | 6/2002 | Yu-San ........................ | 362/619 |
| 6,836,303 B2 * | 12/2004 | Kim ............................ | 362/620 |
| 2003/0123245 A1 * | 7/2003 | Parker et al. ................. | 362/620 |
| 2004/0012945 A1 | 1/2004 | Yamashita et al. | |
| 2004/0095744 A1 * | 5/2004 | Yu et al. ...................... | 362/620 |
| 2006/0044834 A1 * | 3/2006 | Yu .............................. | 362/620 |
| 2008/0002432 A1 * | 1/2008 | Ueno et al. .................. | 362/620 |

FOREIGN PATENT DOCUMENTS

| | | |
|---|---|---|
| JP | 9-281492 A | 10/1997 |
| JP | 2001-264698 A | 9/2001 |
| TW | 200402560 | 2/2004 |
| TW | 592306 | 6/2004 |
| TW | 200428106 | 12/2004 |
| WO | WO 2004/016985 A1 | 2/2004 |

* cited by examiner

*Primary Examiner*—Ismael Negron

(57) ABSTRACT

A backlight module (20) includes a light source (21), a prism sheet (23) and a light guide plate (22). The light guide plate includes an incident surface (221), an emitting surface (223), a bottom surface (222) and a plurality of depressions (224). The emitting surface is located adjoining the incident surface. The depressions are formed on the emitting surface. Each depression has a refractive surface (225) and a reflective surface (226) adjoining the refractive surface. The reflective surface faces the incident surface, and the refractive surface faces away from the incident surface. The light source is arranged besides the light guide plate and facing the incident surface. The prism sheet has a prism surface facing the emitting surface of the light guide plate and forms a plurality of prisms (241) on the prism surface.

10 Claims, 4 Drawing Sheets

LIGHT GUIDE PLATE WITH REFLECTIVE/REFRACTIVE DEPRESSIONS, AND BACKLIGHT MODULE USING THE SAME

FIELD OF THE INVENTION

The present invention relates to light guide plates and backlight modules and, particularly, to a light guide plate and backlight module for use in, e.g., a liquid crystal display (LCD).

BACKGROUND

In a liquid crystal display (LCD) device, a liquid crystal is a substance that does not itself illuminate light. Instead, the liquid crystal relies on receiving light from a light source, thereby displaying images and data. In the case of a typical liquid crystal display device, a backlight module powered by electricity supplies the needed light. Generally, a bottom-lighting type backlight module and/or an edge-lighting type backlight module are/is provided.

FIG. 1 represents a typical backlight module 10 including two prism sheets 1, a diffusion sheet 2, a light guide plate 3, a reflective sheet 4, a light source 5 and a light source cover 6. The prism sheets 1, the diffusion sheet 2, the light guide plate 3 and the reflective sheet 4 are set parallel, on top of each other, in that order. The light source 5 may be any of electroluminiscent lamp (EL), cold cathode fluorescence lamp (CCFL), and light emitting diode (LED). The light source 5 is disposed adjacent to one side of the light guide plate 3. The light guide plate 3 has an emitting surface 7 and a bottom surface 8 opposite to the emitting surface 7. Light emitted from the light source 5 enters the light guide plate 3. Some of the light emits from the bottom surface 8 and reflected by the reflective sheet 4. The reflected light and the rest of the light emit from the emitting surface 7 of the light guide plate 3. Finally, the light passes through the diffusion sheet 2 and the prism sheets 1. The diffusion sheet 2 is configured for uniformly diffusing the emitted light. The prism sheets 1 are configured for collimating the emitted light, thereby improving the brightness of light illumination.

Most of light that passes through the light guide plate 3, the reflective sheet 4, the diffusion sheet 2, and the prism sheets 1, rays gets absorbed by the above optical elements 1, 2, 3, and 4. Thus, the backlight module has low brightness due to a lower light energy utilization rate thereof.

What is needed, therefore, is a light guide plate and a backlight module using the same which can improve their optical brightness.

SUMMARY

A backlight module according to a first preferred embodiment includes a light guide plate, a light source, and a prism sheet. The light guide plate includes a plurality of side surfaces including two main side surfaces, an incident surface disposed at one main side surface, an emitting surface, a bottom surface, and a plurality of depressions. The emitting surface is located adjoining the incident surface, and the bottom surface is opposite to the emitting surface. The depressions are defined on the emitting surface. Each depression has a refractive surface and a reflective surface adjoining the refractive surface. The reflective surface faces the incident surface, and the refractive surface faces away from the incident surface. The light source is disposed adjacent to the incident surface. The prism sheet has a prism surface facing the emitting surface and forms a plurality of elongated prisms on the prism surface.

A light guide plate as above-described according to a preferred embodiment is also provided.

A backlight module according to a second preferred embodiment includes a light guide plate, a light source a prism sheet and a plurality of depressions. The light guide plate includes an incident surface and an emitting surface adjoining the incident surface. The light source is arranged to emit light into the light guide plate via the incident surface. The prism sheet has a prism surface facing the emitting surface. The depressions are formed on the emitting surface. Each depression has a refractive surface and a reflective surface, which allows a part of light refracted by the refractive surface to be projected directly toward the prism surface and the other part of the light refracted by the refractive surface to be projected toward the reflective surface and then reflected toward the prism surface. Orientation of the refractive surface and the reflective surface are configured in a manner such that said part of light is projected toward the prism surface in a direction substantially the same as a direction in which said other part of light is reflected toward the prism surface.

A light guide plate as above-described according to a preferred embodiment is also provided.

Other advantages and novel features will become more apparent from the following detailed description of preferred embodiments when taken in conjunction with the accompanying drawings.

BRIEF DESCRIPTION OF THE DRAWINGS

Many aspects of the light guide plate and related backlight module having the same can be better understood with reference to the following drawings. The components in the drawings are not necessarily to scale, the emphasis instead being placed upon clearly illustrating the principles of the present plate. Moreover, in the drawings, like reference numerals designate corresponding parts throughout the several views.

DETAILED DESCRIPTION OF THE PREFERRED EMBODIMENTS

Reference will now be made to the drawings to describe preferred embodiments of the present light guide plate and backlight module, in detail.

Figure 1:
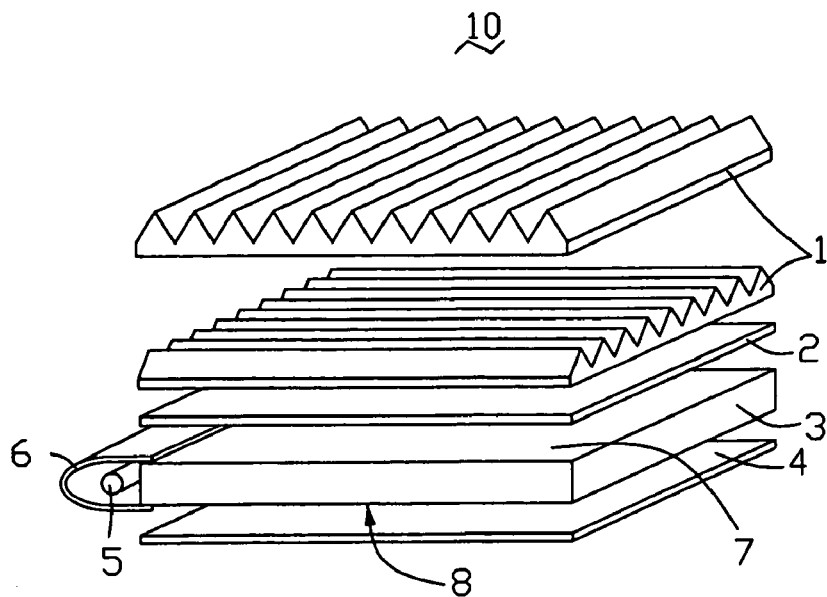
FIG. 1 is a schematic, perspective view of a conventional backlight module.
Figure 2:
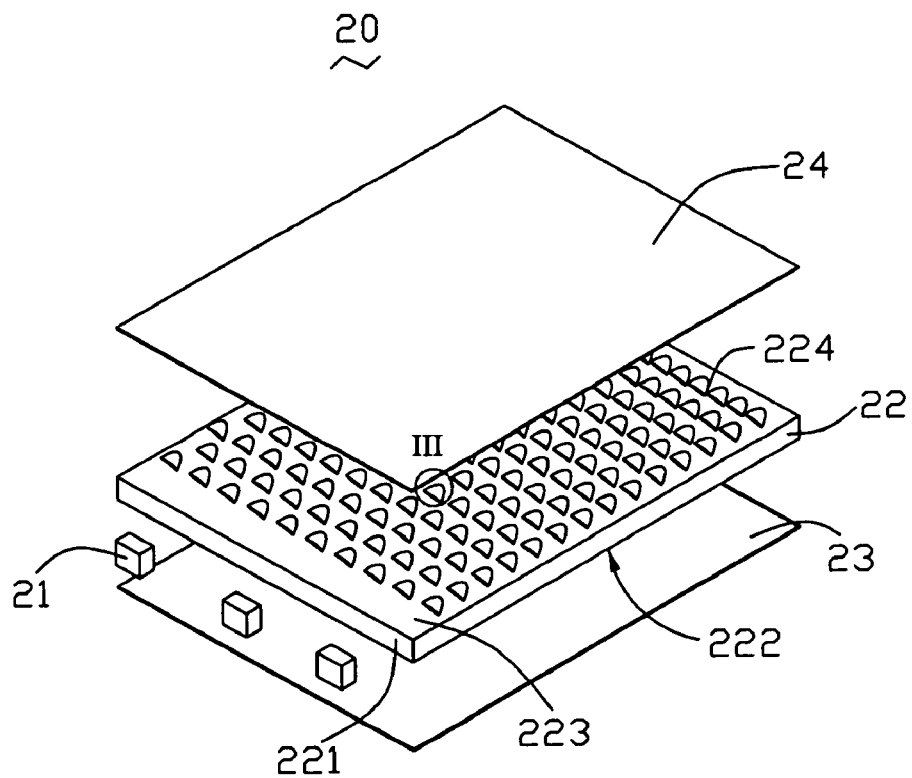
FIG. 2 is a schematic, perspective view of a backlight module according to a first preferred embodiment.

Referring to FIG. 2, a preferred first embodiment backlight module 20 includes a light source 21, a light guide plate 22, a reflective plate 23, and a prism sheet 24. The light guide plate 22 is generally a flat sheet having a substantially rectangular shape from a top view and has a plurality of side surfaces including two main side surfaces. The light guide plate 22 includes an incident surface 221 located at one of the main side surface, an emitting surface 223 located at the other main side surface adjoining the incident surface 221, and a bottom surface 222 opposite to the emitting surface 223. The light source 21 may include a number of point light sources such as light emitting diodes (LEDS). The light source 21 is set besides the light guide plate 22 and faces the incident surface 221. The reflective plate 23 is mounted below the bottom surface 222. The prism sheet 24 is mounted above the emitting surface 223.

Figure 3:
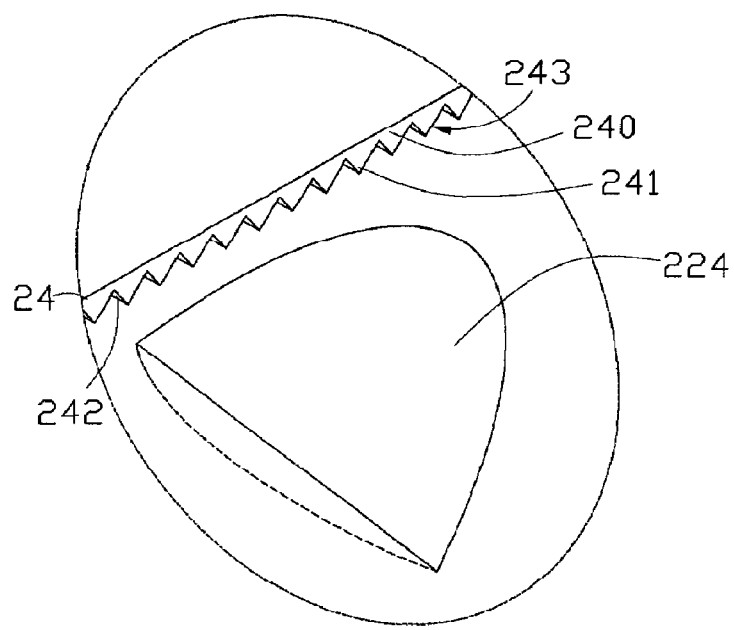
FIG. 3 is an enlarged view of a circle portion III of the light guide plate of FIG. 2.
Figure 4:
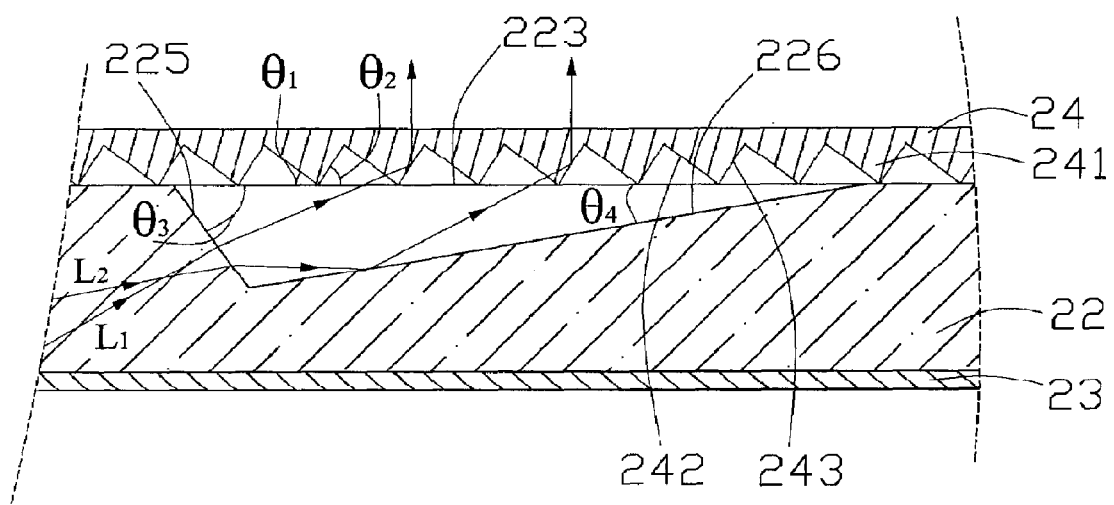
FIG. 4 is a schematic, partially cross-sectional view of the backlight module of FIG. 2 showing light paths.

Referring to FIGS. 2-4, the bottom surface 222 of the light guide plate 22 is substantially flat, and the emitting surface 223 defines a number of depressions 224. Each of the depressions 224 has a same size and shape. Each depression 224 includes a refractive surface 225 and a reflective surface 226 adjoining the refractive surface 225. The reflective surface 226 faces the incident surface 221 and the refractive surface 225 faces away from the incident surface 221. The refractive surface 225 is a flat surface and the reflective surface 226 is a curved surface. A deepest depth of each depression 224 is about 0.005 millimeter. The depressions 224 are distributed in a matrix manner, and are aligned on corresponding imaginary rows parallel to the incident surface 221. A distribution density of the depressions 224 progressively increases with increasing distance from the incident surface 221 to the depressions 224. An acute angle $\theta_3$ defined by the emitting surface 223 with respect to the refractive surface 225 is larger than an acute angle $\theta_4$ defined by the emitting surface 223 with respect to the reflective surface 226.

The prism sheet 24 has a prism surface (not labeled) facing the light guide plate 22. The prism sheet 24 forms a number of elongated micro prisms 241 on the prism surface in a way that parallel faces 240 of the micro prisms 241 are perpendicular to the incident surface 221. The micro prisms 241 protrude out from the prism sheet 24 and non-parallel sides of the micro prisms 241 face the emitting surface 223. Each micro prism 241 is a shape of triangular projection. Each micro prism 241 has two non-parallel sidewalls 242 and 243. The sidewall 242 faces the emitting surface 223. An acute angle $\theta_1$ defined by the sidewall 242 with respect to an imaginary plane that lies atop a crest of each protruding micro prisms 241 is smaller than an acute angle $\theta_2$ defined by the sidewall 243 with respect to the imaginary plane that lies atop the crest of each protruding micro prisms 241, thereby forming a vertex angle slanting away from the incident surface 221.

Also referring to FIG. 4, light emitted from the light source 21 passes through the incident surface 221 and enters the light guide plate 22. Some of the light is directly emitted out of the light guide plate 22. Light not directly emitted is totally reflected by the bottom surface 222 because the incident angle is larger than the critical angle causing a total reflection of light. Reflected light traveling in a path such as L1 is then refracted towards the prism sheet 24 by the refractive surface 225. Other reflected light traveling in a path such as L2 is refracted by the refractive surface 225 to project towards the reflective surface 226 before reflecting off the reflective surface 226 towards the prism sheet 24. The light rays L1 and L2 then enter the prism sheet 24 and are refracted by the sidewalls 242 and reflected by the sidewalls 243 before emitting out of the prism sheet 24 somewhat perpendicular to the emitting surface 223.

Most light emitted from the light source 21 can be altered into parallel light rays perpendicular to the emitting surface 223 by passing through the light guide plate 22 and the prism sheet 24. Therefore, light energy is used efficiently when altering the path of the light. The optical brightness of the backlight module is improved. Furthermore, any light emitting out of the light guide plate 22 via the bottom surface 222 is reflected into light guide plate 22 again by the reflective plate 23 to improve the brightness further.

Figure 5:
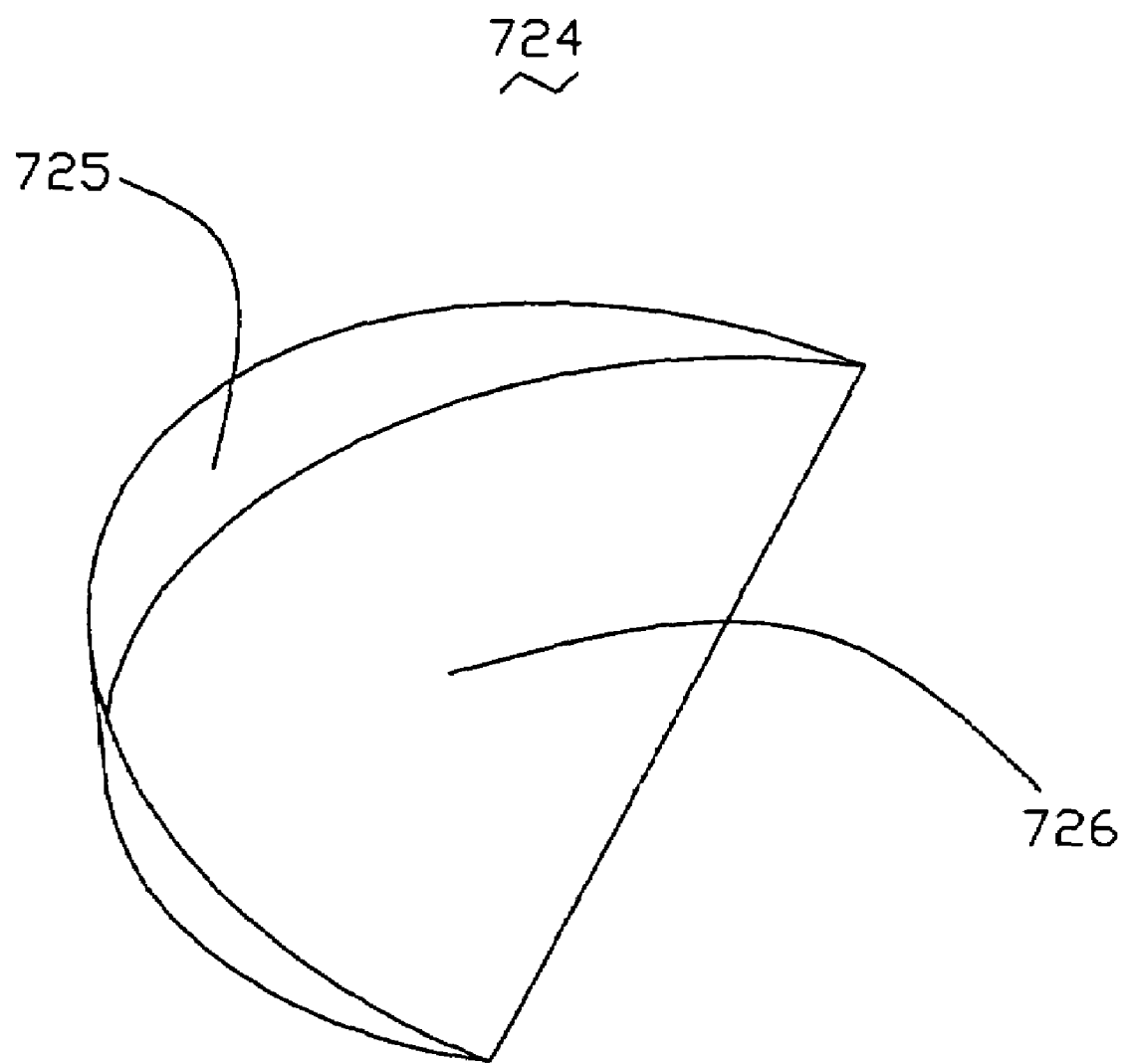
FIG. 5 is another form of the depression of the light guide plate of FIG. 2.

In alternative embodiment, the depressions 224 may also be replaced by the depressions 724 with a shape shown in FIG. 5. The depression 724 is defined by a curved refractive surface 725 and a flat reflective surface 726. The reflective surface 726 faces the incident surface 221, and the refractive surface 725 faces away from the incident surface 221. That is, the refractive surface 225 is replaced by the refractive surface 725 and the reflective surface 226 is replaced by the reflective surface 726. The reflective plate 23 may be omitted when a reflective film is coated on the bottom surface 222 of the light guide plate 22. The light guide plate 22 may further have two incident surfaces 221 opposite to each other, and a light source 21 is provided besides both of the two incident surfaces 221.

Figure 6:
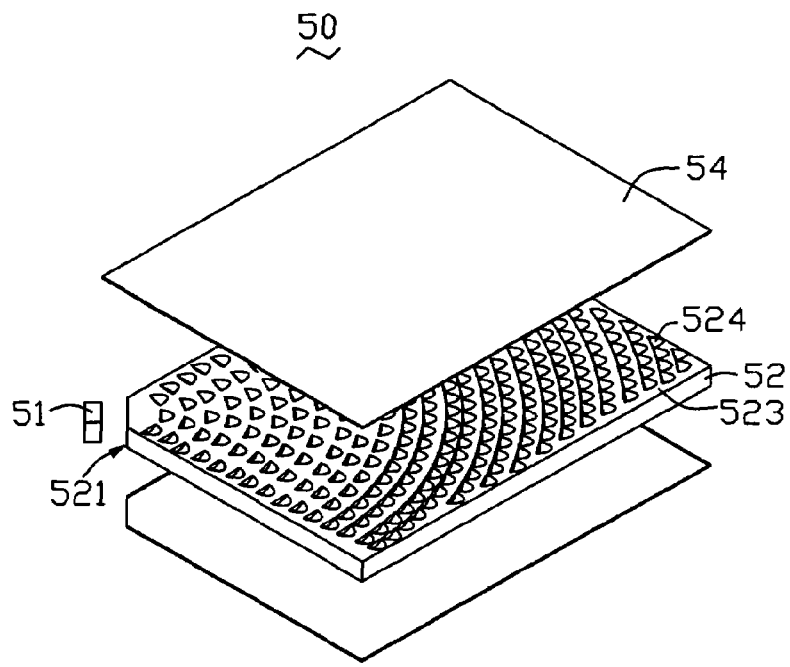
FIG. 6 is a schematic, perspective view of a backlight module according to a second preferred embodiment.

Referring to FIG. 6, a second preferred embodiment of backlight module 50 is shown. The backlight module 50 in accordance with the second preferred embodiment is the same as the first embodiment, except that an incident surface 521 is defined at a cut-out portion of the light guide plate extending from a corner of the emitting surface 223 to a corresponding corner of the bottom surface 222. Furthermore, a light source 51 is a point light source such as an LED disposed at a side of the incident surface 521 facing the incident surface 521. A number of depressions 524 are defined on an emitting surface 523 of the light guide plate 52 and are distributed on the emitting surface 523 in fanned out manner from the light source 51. The distribution density of the depressions 524 progressively increases with increasing distance from the center to the depressions 524. A number of micro prisms (not shown) are formed on a prism sheet 54. Similar to the depressions 524, the micro prisms are distributed on the prism surface in fanned out manner from the light source 51.

Figure 7:
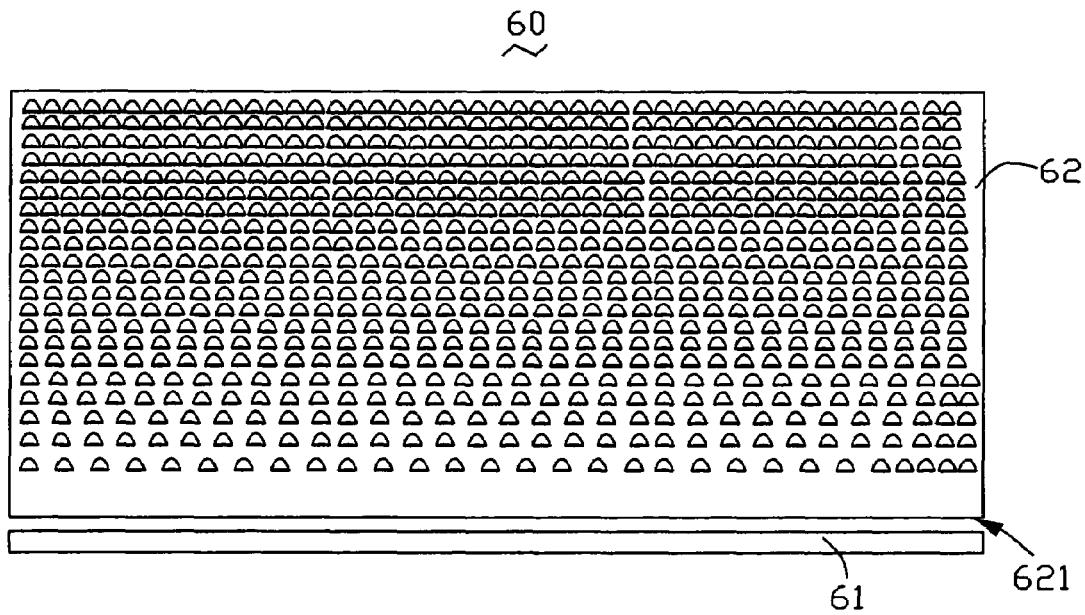
FIG. 7 is a schematic, top view of a backlight module according to a third preferred embodiment.

Referring to FIG. 7, a third preferred embodiment of backlight module 60 is shown. The backlight module 60 in accordance with the third preferred is the same as the first embodiment, except that a light source 60 is a line source such as a cold cathode fluorescence lamp (CCFL). The light source 60 faces an incident surface 621 of a light guide plate 62.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

The invention claimed is:

1. A backlight module comprising:
a light guide plate comprising:
a plurality of side surfaces including two main side surfaces adjoining to each other;
an incident surface disposed at one main side surface;
an emitting surface disposed at the other main side surface;
a bottom surface opposite to the emitting surface; and
a plurality of depressions formed on the emitting surface, each depression having a refractive surface and a reflective surface adjoining the refractive surface, wherein the reflective surface faces the incident surface, and the refractive surface faces away from the incident surface, an acute angle defined by the emitting surface with respect to the refractive surface is larger than an acute angle defined by the emitting surface with respect to the reflective surface;
a light source disposed adjacent to the incident surface; and a prism sheet having a prism surface facing the emitting surface, the prism surface having a plurality of prisms protruding out from the prism surface, each prism being a shape of triangular projection having a vertex angle facing the prism surface, the vertex angle being slanting away from the incident surface.

2. The backlight module according to claim 1, further comprising a reflective plate disposed below the bottom surface of the light guide plate or a reflective film coated at the bottom surface of the light guide plate.

3. The backlight module according to claim 1, wherein the distribution density of the depressions progressively increases with increasing distance from the incident surface.

4. The backlight module according to claim 3, wherein each of the depressions has a same size and shape.

5. The backlight module according to claim 4, wherein one of the refractive surface and the reflective surface of each depression is a flat surface and the other of the refractive surface and the reflective surface of the depression is a curved surface.

6. The backlight module according to claim 3, wherein the depressions are distributed in a matrix manner and are aligned on corresponding imaginary rows parallel to the incident surface.

7. A backlight module comprising:
- a light guide plate including an incident surface and an emitting surface adjoining the incident surface;
- a light source arranged to emit light into the light guide plate via the incident surface;
- a prism sheet having a prism surface facing the emitting surface, the prism surface having a plurality of prisms protruding out from the prism surface, each prism being a shape of triangular projection having a vertex angle facing the prism surface, the vertex angle being slanting away from the incident surface and
- a plurality of depressions formed on the emitting surface, each depression having a refractive surface and a reflective surface which allows a part of light refracted by the refractive surface to be projected directly toward the prism surface and the other part of the light refracted by the refractive surface to be projected toward the reflective surface and then reflected toward the prism surface, wherein orientation of the refractive surface and the reflective surface are configured in a manner such that said part of light is projected toward the prism surface in a direction substantially the same as a direction in which said other part of light is reflected toward the prism surface, an acute angle defined by the emitting surface with respect to the refractive surface is larger than an acute angle defined by the emitting surface with respect to the reflective surface.

8. The backlight module according to claim 7, wherein the distribution density of the depressions progressively increases with increasing distance from the incident surface.

9. The backlight module according to claim 8, wherein the light guide plate further comprises a bottom surface, the bottom surface and the emitting surface are on opposite sides of the light guide plate, the incident surface is disposed at a cut-out portion of the light guide plate extending from a corner of the emitting surface to a corresponding corner of the bottom surface, the depressions are distributed on the emitting surface in fanned out manner from the light source.

10. The backlight module according to claim 9, wherein the micro prisms are distributed on the prism surface in fanned out manner from the light source.

* * * * *